United States Patent
Hsiao et al.

(10) Patent No.: US 11,358,346 B2
(45) Date of Patent: Jun. 14, 2022

(54) METHOD FOR MANUFACTURING GOLF CLUB HEAD PART

(71) Applicant: ADVANCED INTERNATIONAL MULTITECH CO., LTD., Kaohsiung (TW)

(72) Inventors: Te-Fu Hsiao, Kaohsiung (TW); Che-Hao Kuo, Kaohsiung (TW); Chung-Hsin Chang, Kaohsiung (TW)

(73) Assignee: ADVANCED INTERNATIONAL MULTITECH CO., LTD., Kaohsiung (TW)

( * ) Notice: Subject to any disclaimer, the term of this patent is extended or adjusted under 35 U.S.C. 154(b) by 0 days.

(21) Appl. No.: 17/131,040

(22) Filed: Dec. 22, 2020

(65) Prior Publication Data

US 2022/0088892 A1   Mar. 24, 2022

(30) Foreign Application Priority Data

Sep. 18, 2020   (TW) ................................. 109132326

(51) Int. Cl.
| | |
|---|---|
| *A63B 53/04* | (2015.01) |
| *B29C 70/44* | (2006.01) |
| *B29B 11/04* | (2006.01) |
| *B29C 70/54* | (2006.01) |
| *B29L 31/52* | (2006.01) |
| *B29K 101/12* | (2006.01) |

(52) U.S. Cl.
CPC ............ *B29C 70/443* (2013.01); *A63B 53/04* (2013.01); *B29B 11/04* (2013.01); *B29C 70/54* (2013.01); *A63B 2209/02* (2013.01); *B29K 2101/12* (2013.01); *B29L 2031/5227* (2013.01)

(58) Field of Classification Search
None
See application file for complete search history.

(56) References Cited

U.S. PATENT DOCUMENTS

| | | | | |
|---|---|---|---|---|
| 4,581,190 A | * | 4/1986 | Nagamoto | A63B 60/00 264/137 |
| 2003/0134693 A1 | * | 7/2003 | Nakahara | A63B 53/0466 473/345 |

FOREIGN PATENT DOCUMENTS

| | | | | |
|---|---|---|---|---|
| JP | 60-176745 A | * | 9/1985 | |
| JP | 02-180281 A | * | 7/1990 | |
| JP | 04-189373 A | * | 7/1992 | |

* cited by examiner

*Primary Examiner* — Jeffry H Aftergut
(74) *Attorney, Agent, or Firm* — Muncy, Geissler, Olds & Lowe, P.C.

(57) ABSTRACT

A method for manufacturing a golf club head part includes the steps of: sewing at least one roving material onto a base material, so as to form a laminate blank; placing the laminate blank into a cavity of a mold assembly; vacuuming the cavity, and then impregnating a resin material into the laminate blank that is placed in the cavity under vacuum; and thermoforming the laminate blank and the resin material in the cavity into the golf club head part.

6 Claims, 4 Drawing Sheets

METHOD FOR MANUFACTURING GOLF CLUB HEAD PART

CROSS-REFERENCE TO RELATED APPLICATION

This application claims priority to Taiwanese Invention Patent Application No. 109132326, filed on Sep. 18, 2020.

FIELD

The disclosure relates to a method for manufacturing a golf club head part.

BACKGROUND

A conventional golf club head is made of a metal material to enhance its strength for a long-term striking performance, yet use of the metal material may cause the golf club head to be heavy in weight and incur a high manufacturing cost a. With the development of composite materials (such as carbon fiber sheets) which have advantages of lightweight and improved strength, a golf club head part (such as a striking plate and a cover part) is often manufactured using such composite materials to reduce the total weight of the golf club head while maintaining sufficient strength.

In a conventional method for manufacturing a golf club head part that is made of carbon fiber composite materials, a plurality of prepreg layers are stacked on one another, followed by a cropping treatment. Then, a plurality of reinforcing members are disposed on the resultant prepreg layered structure in different directions so as to enhance the strength thereof. After cutting excessive parts of the reinforcing members, the obtained structure is subjected to a thermoforming process, and the resultant blank is then processed by a machinery such as a computer numerically controlled (CNC) machine, so as to obtain the golf club head part having a predetermined shape.

However, the stacking and the cropping steps for the prepreg layers are complicated and the blank needs to be further processed after the thermoforming process, which may incur high labor and time costs, resulting in a low production efficiency of the golf club head part. In addition, unsatisfactory fluidity of a resin material in the prepreg layers makes the blank formed by the thermoforming process to be susceptible to defect formation. Therefore, there is still a need to improve the manufacturing process for the golf club head part.

SUMMARY

Therefore, an object of the disclosure is to provide a method for manufacturing a golf club head part that can alleviate at least one of the drawbacks of the prior art.

The method for manufacturing a golf club head part includes the steps of:
  sewing at least one roving material onto a base material, so as to form a laminate blank;
  placing the laminate blank into a cavity of a mold assembly;
  vacuuming the cavity, and then impregnating a resin material into the laminate blank that is placed in the cavity under vacuum; and
  thermoforming the laminate blank and the resin material in the cavity into the golf club head part.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
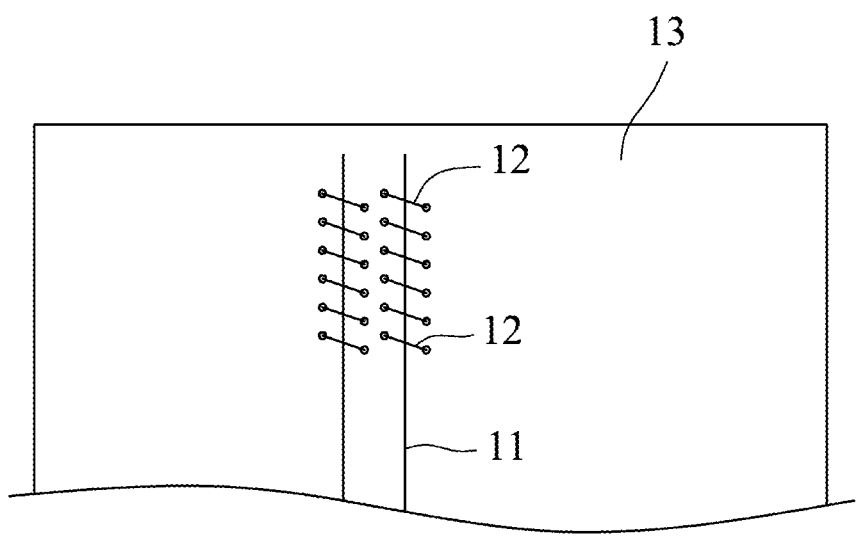
FIGS. 1 to 3 are schematic views illustrating consecutive steps of an embodiment of a method for manufacturing a golf club head part according to this disclosure.
Figure 2:
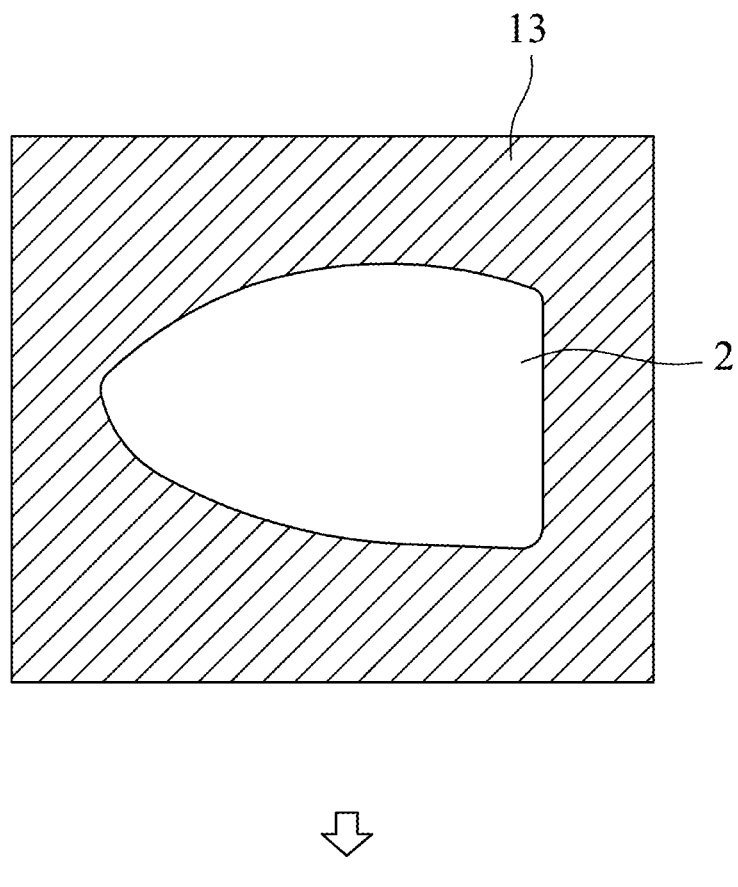
Figure 2:
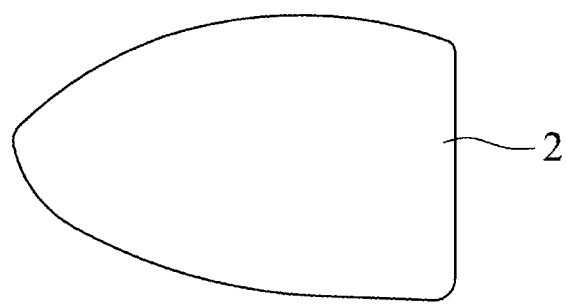

Before the disclosure is described in greater detail, it should be noted that where considered appropriate, reference numerals or terminal portions of reference numerals have been repeated among the figures to indicate corresponding or analogous elements, which may optionally have similar characteristics.

The present disclosure provides an embodiment of a method for manufacturing a golf club head part 4 which includes the steps of:
  a) sewing at least one roving material 11 onto a base material 13, so as to form a laminate blank 2;
  b) placing the laminate blank 2 into a cavity 31 of a mold assembly 3;
  c) vacuuming the cavity 31, and then impregnating a resin material into the laminate blank 2 placed in the cavity 31 under vacuum; and
  d) thermoforming the laminate blank 2 and the resin material in the cavity 31 into the golf club head part 4.

To be specific, referring to FIG. 1, in step a), the at least one roving material 11 is sewed onto a base material 13 using, e.g., a tailored fiber placement (TFP) machine. At least one thread material 12 may be further stitched to the base material 13 to fix the at least one roving material 11 on the base material 13. The sewing and stitching path of the roving material 11 and the thread material 12 may be designed in a predetermined pattern, so as to obtain the laminate blank 2 with a desired three-dimensional structure. In should be noted that the TFP machine may include a plurality of stitching needles, so that a plurality of the laminate blanks 2 may be formed simultaneously to enhance productivity. In certain embodiments, the laminate blank 2 is tailored to have a predetermined shape by trimming the base material 13 before step b).

Examples of the roving material 11 may include, but are not limited to, carbon fibers, glass fibers, and commingled yarns. The commingled yarns may include carbon fibers and/or glass fibers. Examples of the thread material 12 may include, but are not limited to, a cotton yarn, a carbon fiber, a glass fiber, and combinations thereof. Examples of the base material 13 may include, but are not limited to, glass fibers, thermoplastic polymers (such as polyethylene and polypropylene), and a combination thereof. The thermoplastic polymers may be made into a thermoplastic film. The base material 13 may have a thickness that is not greater than 4.5 mm.

As compared to the conventional method, in which the prepreg layers are used and required to be stacked on one another and then subjected to the complicated cropping treatment, the method according to this disclosure can simply form the laminate blank 2 with an improved strength by sewing the roving material 11 and the thread material 12 on the base material 13 using automated machines, and hence labor and time costs can be greatly reduced.

Figure 3:
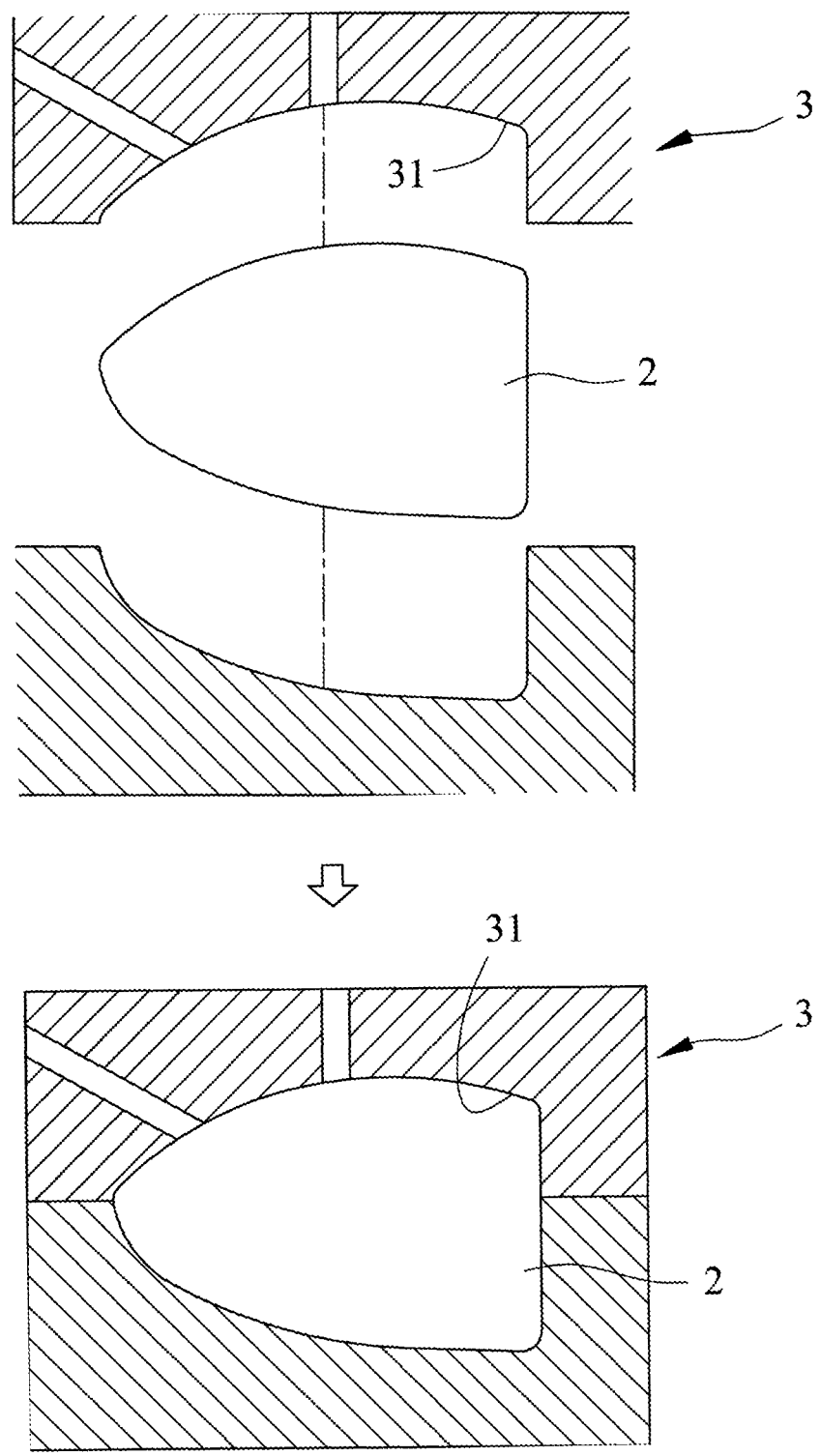
Figure 4:
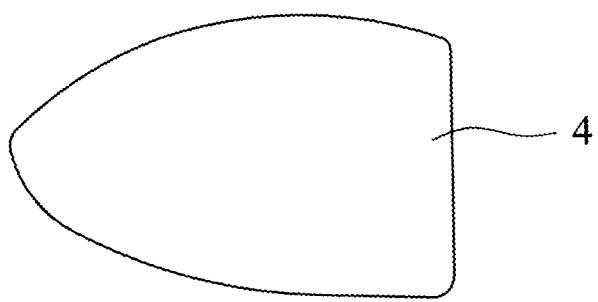
FIG. 4 is a schematic view illustrating the golf club head part manufactured by the method of this disclosure.

Referring to FIG. 3, in step b), the laminate blank 2 is placed into the cavity 31 of the mold assembly 3, which includes an upper mold half and an lower mold half that cooperatively define the cavity 31. In step c), after the upper mold half and the lower mold half are mated and pressed together, the cavity 31 is vacuumed, and then the resin material is impregnated into the laminate blank 2 by applying high pressure. With such procedure, fluidity of the resin material would not be adversely affected by air and pressure, and thus the resin material is capable of being evenly distributed throughout the laminate blank 2. In step d), under an elevated temperature, the laminate blank 2 and the resin material are thermoformed in the cavity 31 into the golf club head part 4 (see FIG. 4). The golf club head part 4 may be a striking plate or a cover part, but is not limited thereto. If a plurality of the laminate blanks 2 are formed in step a), then a plurality of mold assemblies 3 may be used simultaneously in steps b) to d), so as to manufacture a plurality of the golf club head parts 4.

To summarize, the method of this disclosure omits the complicated stacking and cropping procedures for the prepreg layers as required in the conventional method, and the thermoformed product made thereby can directly serve as the golf club head part 4 without the need to be further processed using, e.g., the CNC machine, and thus, labor cost can be greatly reduced so as to enhance production efficiency. Moreover, by impregnating the resin material into the laminate blank 2 that is placed in the cavity 31 under vacuum, the resin fluidity can be improved, and thus, the possibility of obtaining the golf club head part 4 with defects is reduced, thereby enhancing the quality of the golf club head part 4 thus manufactured.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method for manufacturing a golf club head part, comprising the steps of:
    sewing at least one roving material onto a base material, so as to form a laminate blank;
    placing the laminate blank into a cavity of a mold assembly;
    vacuuming the cavity, and then impregnating a resin material into the laminate blank placed in the cavity under vacuum; and
    thermoforming the laminate blank and the resin material in the cavity into the golf club head part.

2. The method according to claim 1, wherein in the sewing step, at least one thread material is further stitched to the base material to fix the at least one roving material on the base material.

3. The method according to claim 1, wherein the laminate blank is tailored to have a predetermined shape by trimming the base material before the placing step.

4. The method according to claim 1, wherein the at least one roving material is selected from the group consisting of carbon fibers, glass fibers, and commingled yarns.

5. The method according to claim 2, wherein the at least one thread material is selected from the group consisting of a cotton yarn, a carbon fiber, a glass fiber, and combinations thereof.

6. The method according to claim 1, wherein the base material is selected from the group consisting of glass fibers, thermoplastic polymers, and a combination thereof.

* * * * *